United States Patent Office 3,123,473
Patented Mar. 3, 1964

3,123,473
PHOTOSENSITIVE TRIPHENYL METHANE
CARBINOL COMPOSITIONS
Meyer S. Agruss, Chicago, Ill., assignor to Miehle-Goss-Dexter, Incorporated, Chicago, Ill., a corporation of Delaware
No Drawing. Filed July 14, 1960, Ser. No. 42,747
13 Claims. (Cl. 96—90)

This invention relates to the art of printing and is particularly concerned with the preparation of new and useful photosensitive compositions which may be coated on paper or other suitable surfaces, in the form of essentially colorless or relatively lightly colored bodies, and which are rendered colored or deeply colored, by exposure, through a desired transparency or the like, to electromagnetic radiation lower than 4000 angstrom units, particularly ultraviolet light or other such activating rays, for instance, X-rays.

It has long been known that solutions of aminotriarylacetonitriles or, in other words, leucocyanides of triphenylmethane dyes, generally in the form of solutions thereof, may be coated on paper or other materials in conjunction with an activator and exposed to ultraviolet light or shorter wave lengths, through a transparency, whereupon said aminotriarylacetonitriles are converted into colored bodies or dyes. Suitable activators known for such purpose are, for instance, alcohols, phenols, carboxylic acids such as tartaric acid, citric acid and benzoic acid, as well as other carboxylic acids and esters thereof, certain nitriles, certain aromatic amines, veratrole, resorcinol, dimethyl ether, ethylene glycol ethers, phosphoric acid esters of monohydroxy compounds, aromatic carbinols, and numbers of other compounds. These approaches, and others, are disclosed in various patents among which may be mentioned U.S. Patents Nos. 2,441,561, 2,528,496, 2,676,-887, 2,829,052, and 2,844,465. Thus, as disclosed in said patents, if an organic solvent solution, for example, a toluene solution, of a leucocyanide of a triphenylmethane dye, for instance, pararosaniline leucocyanide, malachite green leucocyanide, tetrachloro malachite green leucocyanide, crystal violet leucocyanide, and various other leucocyanides of triphenylmethane dyes such as are shown in the aforementioned patents, is coated onto paper, such solution is not affected by ultraviolet light. However, when an activator, for example, a higher molecular weight alcohol or higher molecular weight amine, or other activators, such as the activators disclosed in the aforementioned patents, is present, the leucocyanides of the triphenylmethane dyes become extremely sensitive to ultraviolet light and the leucocyanide compounds are changed quite quickly to their colored dye compounds.

In practical use, the compositions of the prior art, such as those which have been discussed above, have numbers of serious objections. For instance, when paper is coated with a solution of a leucocyanide of a triphenylmethane dye together with activators of the type described above, and said coated papers are exposed to ultraviolet light through a transparency, the colored dye images which result tend to fade out and become substantially colorless in a relatively short period of time, sometimes of the order of 24 hours, and this not infrequently occurs in the dark as well as under ambient light conditions. By "ambient" light conditions is meant normal indoor lighting or daylight. Attempts have been made to meet this problem generally, for example, by the addition of acids, particularly non-volatile organic acids such as stearic acid, and, in certain special instances, by the selection of specific types of leucocyanides. Although the addition of such carboxylic acids as stearic acid tends to prevent the disappearance of the image while stored in the dark, under ambient light storage conditions the background of the image continues to get darker with the passage of time.

Other difficulties have also been encountered in connection with attempting to evolve commercially practicable compositions. Such difficulties have centered around such matters as inadequate maintenance of the sharpness of reproductions, adverse effects resulting from reactions of the leucocyanide or the dye with sizes inherently present in the papers which are coated with the leucocyanide compositions, and the fact that the activation of the dye in the presence of ultraviolet or other actinic light requires a much longer period of time through an ordinary film negative than when no transparency is used. In my copending application Serial No. 4,875, filed January 27, 1960, effective solutions to such problems are disclosed.

It has been discovered, in accordance with the present invention, that certain types of quaternary ammonium triphenylmethane carbinol compounds, distinct from leucocyanides, will, under the influence of ultraviolet rays or electromagnetic radiation less than 4000 angstrom units and in the presence of certain chemical compounds described below, develop good color and sharpness with the essential avoidance of dark reactions and with essentially no background darkening under ambient light conditions. New and useful photosensitive compositions may thus be prepared and employed with excellent results in place of various triphenylmethane dye leucocyanide compositions and the disadvantages attendant on the use of certain of such compositions.

The quaternary ammonium triphenylmethane carbinol compounds which I employ in accordance with my present invention are colorless or essentially colorless when dissolved in solvents for coating onto paper or analogous surfaces. Many of them are, per se, known in the art. Various of them, may be represented by the formula

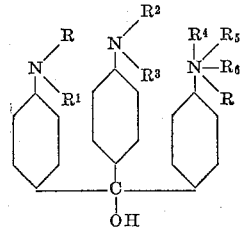

where R, $R^1$, $R^2$, $R^3$, $R^4$ and $R^5$ are lower alkyl radicals, such as methyl, ethyl, propyl, isopropyl, butyl and isobutyl, particularly methyl, $R^6$ is a lower alkyl radical such as above indicated or benzyl, methylbenzyl or dimethylbenzyl, and A is a negative or salt-forming radical or anion such as chlorine, bromine, iodine, hydroxyl, formate, phosphate, methosulfate, or the like. Illustrative of such carbinol compounds are the following:

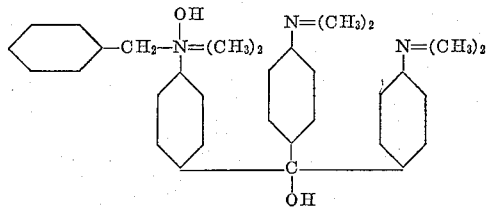

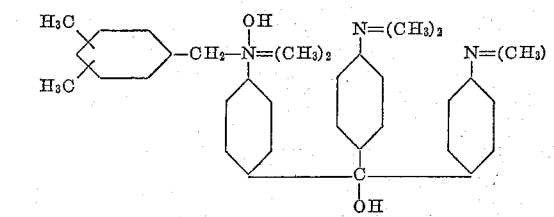

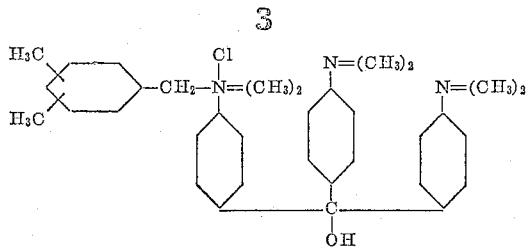

Other materials which, for purposes of this invention, may be considered to be quaternary ammonium triphenylmethane carbinols are the colorless or substantially colorless reaction products of (a) N-polyalkyl-tri (p-aminophenyl) methanes including the carbinols having from 5 to 6 alkyl radicals of not more than 4 C-atoms each attached to its N-atoms with (b) quaternary ammonium hydroxides, which materials are disclosed in U.S. Patents Nos. 2,755,200 and 2,755,201; and the reaction products of (a) certain polyamino-triarylmethanes with (b) quaternary ammonium hydroxides disclosed in U.S. Patent No. 2,755,202. Since such materials are disclosed in detail in said patents, no further description of them here is necessary.

While the essentially colorless quaternary ammonium triphenylmethane carbinol compounds will, under the influence of electromagnetic radiation in the wave length range up to 4000 angstrom units, be converted to colored dyes, even in the absence of activators, the colorations produced are weak. From the standpoint of practical considerations, therefore, activators should be used therewith. Suitable activators which may be utilized in conjunction with the quaternary ammonium triphenylmethane carbinols are chemical compounds, which, when subjected to the aforesaid activating rays, undergo change in chemical composition, the changed chemical compounds possessing an acidic reaction. Among the chemical compounds which have the above-described property or characteristic, those which have been found to be particularly satisfactory are certain halogen-containing compounds and certain boron-containing compounds.

Illustrative examples of said halogen-containing compounds are phenylphosphorodichloridate, chloromethylphosphorodichloridate, dibutylphosphorochloridate, and dioctylphosphorochloridate, and the corresponding bromine and iodine derivatives. This class of compounds can be represented by the formula

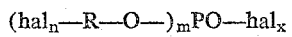

where R is an aliphatic or aromatic radical, particularly a hydrocarbon radical, hal is chlorine, bromine or iodine, $x$ is an integer from 1 to 2, $n$ is zero or 1, and $m$ is 1 when $x$ is 2 and $m$ is 2 when $x$ is 1. R may be, by way of example, alkylene such as methylene, ethylene, propylene, isopropylene, or butylene; alkyl such as methyl, ethyl, propyl, isopropyl, butyl, isobutyl, hexyl, octyl, iso-octyl, decyl or dodecyl; or phenyl, benzyl, tolyl, cresyl, naphthyl, and isopropyl naphthyl.

Illustrative examples of said boron-containing compounds are alkoxyboroxines, particularly tri-lower alkoxyboroxines, examples of which are trimethoxyboroxine, triethoxyboroxine, and tripropoxyboroxine. These compounds may be represented by the formula

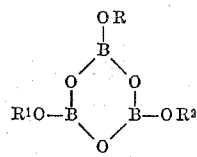

where R, R¹ and R² are alkyl groups or halogen-substituted alkyl groups, particularly lower alkyl groups and lower halogen-substituted alkyl groups such as methyl, ethyl, propyl, isopropyl, butyl, isobutyl, trichloromethyl and trifluoromethyl.

Other compounds, not falling into either of the two foregoing subgroups, and which are likewise useful as activators in the practice of my invention, are orthonitrobenzaldehyde and hydroxyl ammonium chloride. These compounds, too, under the influence of ultraviolet or similar radiations, are converted to a different compound which possesses an acidic reaction.

The foregoing activators, it will be seen, are in themselves ineffective to bring about coloration of the colorless quaternary ammonium triphenylmethane carbinol but, under the influence of electromagnetic radiation lower than 4000 angstrom units, they are converted to different chemical compounds having a greater acidity and sufficient to enhance coloration of said triphenylmethane carbinol.

Still other compounds which, per se, can be used as activators pursuant to my present invention are 4-bis(p-hydroxyphenyl) pentanoic acid (a monocarboxylic acid made by reacting 2 mols of phenol with 1 mol of levulinic acid, said resulting 4-bis(p-hydroxyphenyl) pentanoic acid containing 1 free carboxyl group and 2 phenolic groups); Polyether Acid E-3 (made by reacting 4-bis(p-hydroxyphenyl) pentanoic acid with epichlorhydrin to form a compound containing a plurality of carboxyl groups, a plurality of phenol groups, and a plurality of ether groups); Polyether Acid N-1 (made by reacting 4-bis(p-hydroxyphenyl) pentanoic acid and dichloroethyl ether, and resulting reaction product containing 4 carboxyl groups, 2 phenol groups, and 4 other linkages); Polyether Acid B-4 (made by reacting 4-bis(p-hydroxyphenyl) pentanoic acid with dichlorobutane, said reaction product containing a plurality of carboxyl groups, a plurality of phenol groups, and a plurality of ether linkages); and the methyl ester of 4-bis(p-hydroxyphenyl) pentanoic acid.

Various organic solvents can be utilized for the quaternary ammonium triphenylmethane carbinols. Low boiling or volatile alcohols, ketones, ethers, esters, and hydrocarbons are available. Typical examples of organic solvents are methyl alcohol, ethyl alcohol, isopropyl alcohol, acetone, dioxane, methylethyl ketone, ethyl ether, isopropyl ether, ethyl acetate, nitromethane, nitroethane, benzene, toluene, dimethylformamide and tetrahydrofurane.

The proportions of the ingredients are variable within reasonable limits.

The quaternary ammonium triphenylmethane carbinols will generally be utilized in proportions of the order of 0.5% to 3%, preferably from about 1% to 1.5%, by weight of the solution in which they are incorporated and which is utilized for effecting coating of the paper or equivalent surface.

The activating agents will generally be utilized in proportions of the order of 2 to 25%, preferably about 5 to 12%, by weight of the solution in which the same are incorporated.

The following examples are illustrative of compositions falling within the scope of the invention. They are, of course, not to be construed as in any way limitative of the invention since numerous changes may be made, with respect to selection of quaternary ammonium triphenylmethane carbinols, alkoxyboroxines or other activators, coatings, ranges of proportions, and the like, without departing from the novel principles and teachings presented herein. All parts listed are by weight percent.

*Example 1*

| | |
|---|---|
| Quaternary ammonium salt of Crystal Violet | 1 |
| Trimethoxyboroxine | 5 |
| 1-butoxyethoxy-2-propanol | 35 |
| 20% solution of ½ second cellulose acetate butyrate in 50–50 mixture of toluene and ethyl acetate | 25 |
| Dioxane | 34 |

Example 2

| | |
|---|---|
| Quaternary ammonium salt of Crystal Violet | 1 |
| Dibutyl phosphorochloridate | 5 |
| 20% solution of ½ second cellulose acetate butyrate in 50–50 mixture of toluene and ethyl acetate | 25 |
| Dioxane | 69 |

Example 3

| | |
|---|---|
| Quaternary ammonium salt of Crystal Violet | 1 |
| 1-butoxyethoxy-2-propanol | 37 |
| 20% solution of ½ second cellulose acetate butyrate in 50–50 mixture of toluene and ethyl acetate | 25 |
| Dioxane | 37 |

Example 4

| | |
|---|---|
| Quaternary ammonium salt of Crystal Violet | 2 |
| Dibutyl phosphorochloridate | 4 |
| 1-butoxyethoxy-2-propanol | 14 |
| Tetraethylene glycol dimethyl ether | 14 |
| 20% solution of ½ second cellulose acetate butyrate in 50–50 mixture of toluene and ethyl acetate | 25 |
| Toluene | 41 |

Example 5

| | |
|---|---|
| Quaternary ammonium salt of Crystal Violet | 2 |
| Mono-phenyl ether of ethylene glycol | 14 |
| 4-bis(p-hydroxyphenyl) pentanoic acid | 4 |
| 20% solution of ½ second cellulose acetate butyrate in 50–50 mixture of toluene and ethyl acetate | 25 |
| Dioxane | 55 |

Each of the foregoing compositions is coated onto paper on which advantageously a thin barrier coating comprising a toluene-ethyl acetate solution of cellulose acetate butyrate is first deposited and then dried. After the coatings are dried, they are exposed to a source of ultraviolet light through a cellulose acetate butyrate, cellulose acetate or other transparency. The resulting colored papers show good reproductions which are stable over long periods of time to conditions of darkness as well as ambient light.

Transparent cellulose acetate butyrates represent especially desirable organic film-forming barrier coatings, or coatings in solution in the quaternary ammonium triphenylmethane carbinols and the alkoxyboroxines are dispersed or dissolved, or as top coatings. Other transparent organic film-forming materials such as polyvinyl alcohols, cellulose acetates, polyvinyl butyrals, and the like, can be used.

Instead of utilizing a single coating of a given thickness containing the quaternary ammonium triphenylmethane carbinols, it is usually more desirable to employ a plurality of coatings, either two or more, each of thinner character so as to provide a total thickness corresponding to what would otherwise be in the form of a single coating.

The quaternary ammonium triphenylmethane carbinols, particularly in the presence of alkoxyboroxines and other activating agents, are, as stated above, sensitive when subjected to ultra-violet light and various of them are also sensitive to other electromagnetic radiation shorter than 4000 angstrom units. Moreover, within the ultraviolet range or the aforesaid range of electromagnetic radiation, the various quaternary ammonium triphenylmethane carbinols vary in the sensitivity with different wave lengths. In general, the range of wave lengths in which sensitivity mainly occurs is approximately 2000 to 4000 angstrom units, with strongest sensitivity usually lying in the range of 2500 to 3400 angstrom units. Various suitable sources of the aforesaid rays or radiation are available in the art including, by way of example, quartz mercury lamps, ultraviolet cored carbon arcs, and high-flash lamps.

Transparencies of various types can be employed as, for instance, those of cellulose acetate and cellulose acetate butyrate, advantageously of a thickness not appreciably exceeding 0.0025 inch. When ultraviolet rays are passed through an ordinary film negative, the time required to cause formation of the dye from its quaternary ammonium triphenylmethane carbinol is much longer than when no transparency is used. Hence, in order to obtain rapid activation of the said carbinols, the use of transparencies of the character indicated above is especially advantageous.

While, at least for most purposes, papers will constitute the surfaces on which the photosensitive coatings are deposited, it will be understood that, in the broader aspects of the invention, various other materials can be used such as metals, glass, textile fabrics, and sheet stock or films of synthetic plastics such as cellulose acetate, cellophane, cellulose acetate butyrate, etc.

The photosensitive compositions of the present invention may have incorporated therein various supplemental agents such as have heretofore been utilized in known photosensitive compositions so long as they do not adversely affect the desired properties and characteristics of said compositions.

The invention is of value in the arts of color and multicolor printing, photography and photoduplication, microfilm enlargement, and actinometry.

What is claimed and desired to be protected by Letters Patent of the United States is:

1. A photosensitive composition which comprises a substantially colorless quaternary ammonium triphenylmethane carbinol and an alkoxyboroxine, said carbinol being convertible, under the influence of electromagnetic radiation in the wave length range up to 4000 angstrom units, to a colored dye, said alkoxyboroxine being used in amount sufficient to enhance the color of said carbinol under the influence of said radiation.

2. A photosensitive composition which comprises a substantially colorless quaternary ammonium triphenylmethane carbinol and a tri-lower alkoxyboroxine, said carbinol being convertible, under the influence of electromagnetic radiation in the wave length range up to 4000 angstrom units, to a colored dye, said alkoxyboroxine being used in amount sufficient to enhance the color of said carbinol under the influence of said radiation.

3. A photosensitive composition which comprises a substantially colorless quaternary ammonium triphenylmethane carbinol and trimethoxyboroxine, said carbinol being convertible, under the influence of electromagnetic radiation in the wave length range up to 4000 angstrom units, to a colored dye, said trimethoxyboroxine being used in amount sufficient to enhance the color of said carbinol under the influence of said radiation.

4. A photosensitive composition which comprises an organic solvent solution containing a transparent organic film-forming material, a substantially colorless quaternary ammonium triphenylmethane carbinol and an alkoxyboroxine, said carbinol being convertible, under the influence of electromagnetic radiation in the wave length range up to 4000 angstrom units, to a colored dye, said alkoxyboroxine being used in amount sufficient to enhance the color of said carbinol under the influence of said radiation.

5. A photosensitive composition which comprises an organic solvent solution containing cellulose acetate butyrate, a substantially colorless quaternary ammonium triphenylmethane carbinol and trimethoxyboroxine, said carbinol being convertible, under the influence of electromagnetic radiation in the wave length range up to 4000 angstrom units, to a colored dye, said trimethoxyboroxine being used in amount sufficient to enhance the color of said carbinol under the influence of said radiation.

6. Photosensitive material comprising a surface carrying a substantially colorless quaternary ammonium triphenylmethane carbinol and 4-bis(p-hydroxyphenyl) pentanoic acid, said carbinol being convertible, under the influence of electromagnetic radiation in the wave length range up to 4000 angstrom units, to a colored dye, said 4-bis(p-hydroxyphenyl) pentanoic acid being used in amount sufficient to enhance the color of said carbinol under the influence of said radiation.

7. Photosensitive material comprising sheet stock carrying a transparent organic film coating containing a substantially colorless quaternary ammonium triphenylmethane carbinol and a tri-lower alkoxyboroxine, said carbinol being convertible, under the influence of electromagnetic radiation in the wave length range up to 4000 angstrom units, to a colored dye, said alkoxyboroxine being used in amount sufficient to enhance the color of said carbinol under the influence of said radiation.

8. Photosensitive material comprising paper sheet stock carrying a transparent cellulose acetate butyrate coating containing a substantially colorless quaternary ammonium triphenylmethane carbinol and trimethoxyboroxine, said carbinol being convertible, under the influence of electromagnetic radiation in the wave length range up to 4000 angstrom units, to a colored dye, said trimethoxyboroxine being used in amount sufficient to enhance the color of said carbinol under the influence of said radiation.

9. A material carrying a colored dye on its surface resulting from the action of electromagnetic radiation of wave length in the range up to 4000 angstrom units on a substantially colorless quaternary ammonium triphenylmethane carbinol and an alkoxyboroxine in amount sufficient to enhance the color of said carbinol under the influence of said radiation.

10. Sheet stock carrying a colored dye on its surface resulting from the action of electromagnetic radiation of wave length in the range up to 4000 angstrom units on a substantially colorless quaternary ammonium triphenylmethane carbinol and a tri-lower alkoxyboroxine in amount sufficient to enhance the color of said carbinol under the influence of said radiation.

11. Paper sheet stock having a transparent organic film coating carrying a colored dye resulting from the action of electromagnetic radiation of wave length in the range up to 4000 angstrom units on a substantially colorless quaternary ammonium triphenyl-methane carbinol and trimethoxyboroxine in amount sufficient to enhance the color of said carbinol under the influence of said radiation.

12. A photosensitive composition which comprises a substantially colorless quaternary ammonium triphenylmethane carbinol and, as an activator for said carbinol, a chemical compound which is ineffective to bring about coloration of said carbinol but which, under the influence of electromagnetic radiation in the wave length range up to 4000 angstrom units, is converted to a different chemical compound having a greater acidity and sufficient to enhance coloration of said carbinol, said carbinol being convertible, under the influence of such electromagnetic radiation, to a colored dye, said activator being used in amount sufficient to enhance the color of said carbinol under the influence of said radiation.

13. Photosensitive material comprising a surface carrying a substantially colorless quaternary ammonium triphenylmethane carbinol and, as an activator for said carbinol, a chemical compound which is ineffective to bring about coloration of said carbinol but which, under the influence of electromagnetic radiation in the wave length range up to 4000 angstrom units, is converted to a different chemical compound having a greater acidity and sufficient to enhance coloration of said carbinol, said carbinol being convertible, under the influence of such electromagnetic radiation, to a colored dye, said activator being used in amount sufficient to enhance the color of said carbinol under the influence of said radiation.

References Cited in the file of this patent

UNITED STATES PATENTS

| | | |
|---|---|---|
| 2,325,038 | Chalkley | July 27, 1943 |
| 2,839,542 | Chalkley | June 17, 1958 |
| 2,855,303 | Chalkley | Oct. 7, 1958 |

FOREIGN PATENTS

| | | |
|---|---|---|
| 6,714 | Germany | Oct. 27, 1878 |

OTHER REFERENCES

Journal of the American Chemical Society, vol. 57, 1935, pp. 1151–1154.

Conant and Blatt, The Chemistry of Organic Compounds, 4th ed., The Macmillan Co., New York, 1952, p. 524.